(12) United States Patent
French et al.

(10) Patent No.: US 9,384,298 B2
(45) Date of Patent: Jul. 5, 2016

(54) PREVIEWING WEB PAGES ASSOCIATED WITH SEARCH RESULTS

(75) Inventors: Charles Hastings French, Seattle, WA (US); Nathan Deepak Jhaveri, Seattle, WA (US); Igor Avramovic, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1046 days.

(21) Appl. No.: 13/325,235

(22) Filed: Dec. 14, 2011

(65) Prior Publication Data
US 2013/0159923 A1   Jun. 20, 2013

(51) Int. Cl.
*G06F 3/048* (2013.01)
*G06F 17/30* (2006.01)

(52) U.S. Cl.
CPC .... *G06F 17/30899* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 7,162,473 B2* | 1/2007 | Dumais | G06F 17/30613 |
| 7,801,885 B1 | 9/2010 | Verma | |
| 7,814,425 B1 | 10/2010 | O'Shaugnessy et al. | |
| 2003/0146939 A1* | 8/2003 | Petropoulos et al. | 345/810 |
| 2004/0205514 A1 | 10/2004 | Sommerer et al. | |
| 2006/0095424 A1 | 5/2006 | Petropoulos et al. | |
| 2006/0265417 A1* | 11/2006 | Amato et al. | 707/102 |
| 2006/0282416 A1* | 12/2006 | Gross et al. | 707/3 |
| 2006/0294476 A1* | 12/2006 | Buckley | G06F 17/30716 715/781 |
| 2007/0204232 A1* | 8/2007 | Ray | G06F 17/30905 715/738 |
| 2008/0022229 A1* | 1/2008 | Bhumkar et al. | 715/838 |
| 2008/0027928 A1* | 1/2008 | Larson | 707/5 |
| 2008/0034329 A1* | 2/2008 | Posner | G06F 9/4446 715/856 |
| 2008/0071743 A1* | 3/2008 | Jhaveri et al. | 707/3 |
| 2008/0235594 A1 | 9/2008 | Bhumkar et al. | |
| 2009/0234811 A1 | 9/2009 | Jamil et al. | |
| 2010/0030763 A1* | 2/2010 | Chi | G06F 17/30864 707/770 |
| 2010/0146012 A1 | 6/2010 | Beaudreau et al. | |

OTHER PUBLICATIONS

Paek, et al., "WaveLens: A New View onto Internet Search Results", In Proceedings of the SIGCHI Conference on Human Factors in Computing Systems, Apr. 24-29, 2004, 8 pages.

* cited by examiner

*Primary Examiner* — Stephen Alvesteffer
(74) *Attorney, Agent, or Firm* — Dave Ream; Tom Wong; Micky Minhas (57) ABSTRACT

Systems, methods, and computer-readable storage media for previewing search results determined in response to search queries input into a browser toolbar search box are provided. Descriptors of search results determined to match the input search query are presented in a search results window that overlays a first portion of the browser web page. Upon receiving an indication that the user desires to view one of the presented search results, a preview of a web page associated with the indicated search result is presented overlaying a second portion of the browser page. If the user determines from the preview that the indicated search result does not provide the desired information, s/he may move the mouse pointer to a different search result. In response, a web page associated with the second indicated search result is presented overlaying the second portion of the browser page for the user to preview.

20 Claims, 9 Drawing Sheets

PREVIEWING WEB PAGES ASSOCIATED WITH SEARCH RESULTS

BACKGROUND

In today's search experience, users must use the limited information provided on a search engine results page (SERP) to ascertain which web site determined to match an input search query contains the information s/he desires. Upon selection of a particular search result, the user is navigated away from the SERP to a web site associated with the selected search result. If s/he selected a web site that does not contain the desired information, s/he must navigate back to the SERP and either find another result that appears to contain the desired information or change the input search query. This back-and-forth process costs the user time and effort in a sometimes futile attempt to obtain the information desired.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, previewing search results determined in response to a search query input, for instance, into a search box associated with a browser toolbar. Descriptors of search results determined to match or satisfy the input search query are presented in a search results window that overlays a first portion of the browser web page, and fetching or downloading of a web page associated with each of the presented search results begins. Instant answers, advertisements, and the like, may also be presented in the search results window. Upon receiving an indication (e.g., a hover-over or mouse-over event) that the user desires to preview one of the presented search results, a preview of a web page associated with the indicated search result is presented such that it overlays a second portion of the browser page. Because fetching of web pages associated with the presented search results likely began prior to receiving the user-indication, the web page preview is quickly presented. Unless the user selects (e.g., clicks on) the indicated search result, the browser does not navigate to the indicated page. Thus, if the user determines from the preview that the indicated search result does not provide the desired information, s/he may simply move the mouse pointer such that a different search result is indicated. In response, a web page associated with the second indicated search result is quickly presented for the user to preview. In this way, less time and effort are required by the user to find the result that contains the desired information.

BRIEF DESCRIPTION OF THE DRAWINGS

The present invention is illustrated by way of example and not limited in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, previewing search results determined in response to search queries input, for instance, into a search box associated with a browser toolbar. Descriptors of search results determined to match or satisfy an input search query are presented in a search results window that overlays a first portion of the browser web page, and fetching or downloading of a web page associated with each of the presented search results begins. Upon receiving an indication (e.g., a hover-over or mouse-over event) that the user desires to preview one of the presented search results, a preview of a web page associated with the indicated search result is presented such that it overlays a second portion of the browser page. Because fetching of web pages associated with the presented search results likely began prior to receiving the user-indication, the web page preview is quickly presented.

Unless the user selects (e.g., clicks on) the indicated search result, the browser does not navigate to the indicated page. Thus, if the user determines from the preview that the indicated search result does not provide the desired information, s/he may simply move the mouse pointer such that a different search result is indicated. In response, a web page associated with the second indicated search result is quickly presented for the user to preview.

In embodiments, in addition to search results, instant answers and/or advertisements may be presented in the search results window. Upon receiving an indication (e.g., a hover-over or mouse-over event) that the user desires to preview a presented answer or advertisement, a preview of a web page associated with the indicated answer or advertisement is presented such that it overlays a second portion of the browser page. Previewing in this way, particularly of advertisements, may provide an additional revenue stream for search providers. Further, like with search results, because fetching of web pages associated with the advertisements likely began prior to receiving the user-indication, the web page preview is quickly presented. Unless the user selects (e.g., clicks on) the indicated advertisement or answer, the browser does not navigate to the indicated page. Thus, if the user determines from the preview that the indicated advertisement or answer does not provide the desired information, s/he may simply remove the mouse pointer from the indicated answer or advertisement and the preview will cease to be presented.

Accordingly, one embodiment of the present invention is directed to one or more computer-readable storage media storing computer-useable instructions that, when used by one or more computing devices, cause the one or more computing devices to perform a method for previewing search results in association with a web browser having a browser page and a toolbar. The method includes receiving a search query input into a search box associated with the web browser toolbar and presenting a search results window overlaying a first portion of the browser page. The first portion is less than a total area of the browser page and the search results window contains descriptors associated with one or more search results determined to match the input search query. The method further includes receiving an indication of a user desire to preview one of the one or more search results presented in the search results window and presenting a preview of a web page associated with the one of the one or more search results. The preview overlays a second portion of the browser page that differs from the first portion.

Another embodiment of the present invention is directed to a system for previewing search results in association with a web browser having a browser page and a toolbar. The system comprises a computing device having one or more processors and one or more computer-readable storage media, and a data store coupled with the computing device. The computing device is configured to receive a search query input into a search box associated with the web browser toolbar and present a search results window overlaying a first portion of the browser page. The first portion is less than a total area of the browser page and the search results window contains descriptors associated with one or more search results determined to match the input search query. The system is further configured to pre-fetch at least a portion of a web page associated with each of the one or more search results presented in the search results window, receive a hover-over or mouse-over event with respect to one of the one or more search results indicating a user desire to preview the one of the one or more search results, and present a preview of a web page associated with the one of the one or more search results. The preview overlays a second portion of the browser page that differs from the first portion.

In yet another embodiment, the present invention is directed to a method for previewing search results in association with a web browser having a browser page and a toolbar. The method includes receiving a search query input into a search box associated with the web browser toolbar and presenting a search results window overlaying a first portion of the browser page. The first portion is less than a total area of the browser page and the search results window contains descriptors associated with one or more search results determined to match the input search query. The method further includes receiving a first hover-over or mouse-over event with respect to one of the one or more search results indicating a user desire to preview the one of the one or more search results and presenting a preview of a web page associated with the one of the one or more search results. The preview overlays a second portion of the browser page that differs from the first portion. Still further, the method includes receiving a user selection of the one of the one or more search results and navigating, in the web browser, to the web page associated with the one of the one or more search results. Upon navigating to the web page associated with the one of the one or more search results, the search results window is no longer presented.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
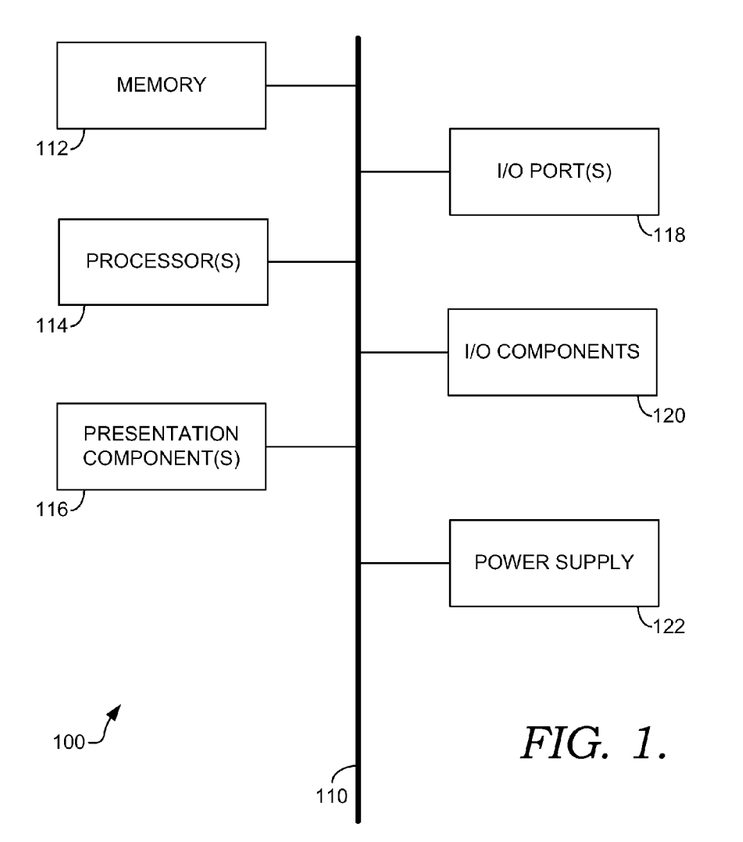
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention relate to systems, methods, and computer-readable storage media for, among other things, previewing search results determined in response to a search query input, for instance, into a search box associated with a browser toolbar. Descriptors of search results determined to match or satisfy the input search query are presented in a search results window that overlays a first portion of the browser web page, and fetching or downloading of a web page associated with each of the presented search results begins. Upon receiving an indication (e.g., a hover-over or mouse-over event) that the user desires to preview one of the presented search results, a preview of a web page associated with the indicated search result is presented such that it overlays a second portion of the browser page. Because fetching of web pages associated with the presented search results likely began prior to receiving the user-indication, the web page preview is quickly presented. Unless the user selects (e.g., clicks on) the indicated search result, the browser does not navigate to the indicated page. Thus, if the user determines from the preview that the indicated search result does not provide the desired information, s/he may simply move the mouse pointer such that a different search result is indicated. In response, a web page associated with the second indicated search result is quickly presented for the user to preview. Previewing of search results is described in detail herein. It should be noted, however, that the systems and methods described apply equally to instant answers, advertisements, and the like. As such, reference to search result previews is meant to encompass previewing of advertisements, answers and the like.

Figure 2:
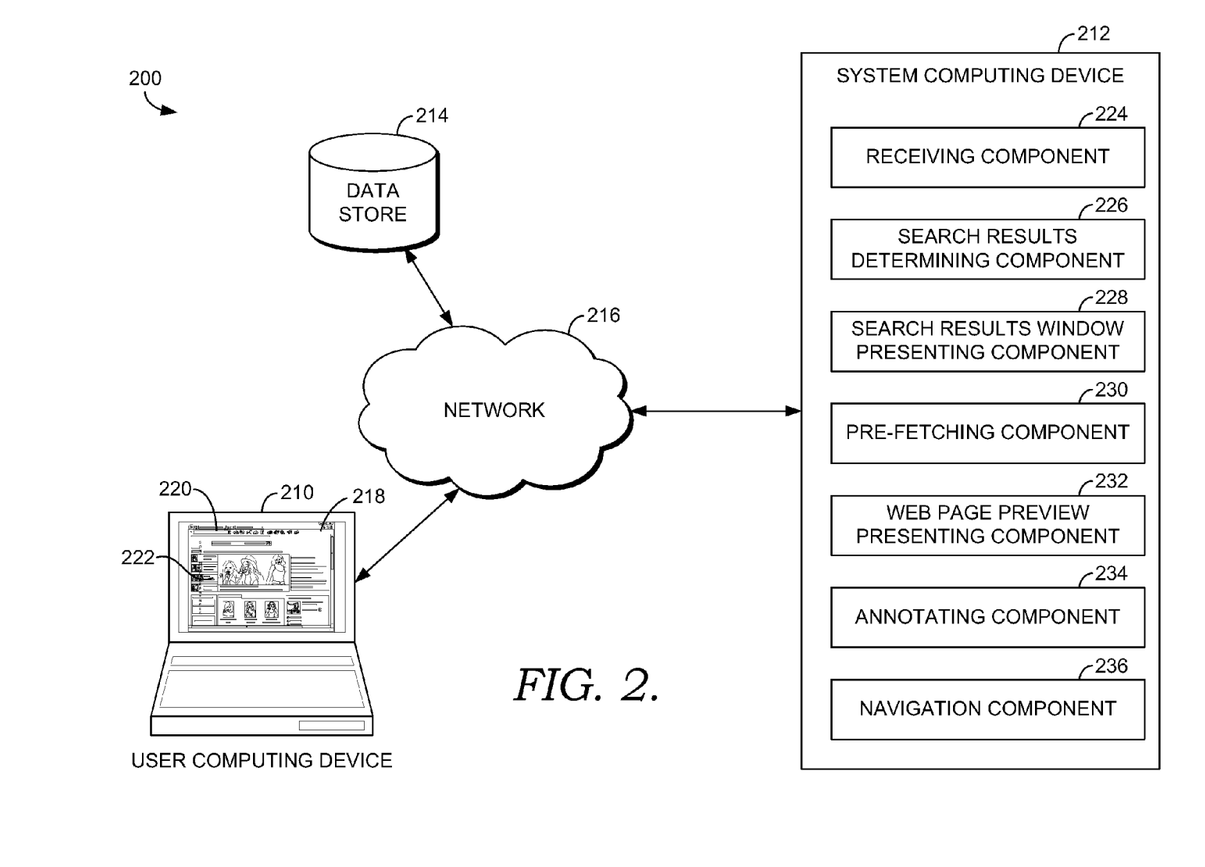
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which search results determined in response to a search query input, for instance, into a search box associated with a browser toolbar may be previewed prior to selection and navigation thereto. As will be described in further detail below, embodiments of the present invention provide systems and methods wherein descriptors of search results determined to match an input search query are presented in a search results window that overlays a first portion of the browser web page and, upon a user hovering over one of the search result descriptors, a preview of a web page associated with the indicated search result is presented such that it overlays a second portion of the browser page. In this way, the user may preview the content of a particular search result without having to navigate to the web page associated with the result. This saves the user time and effort in locating a search result that includes the information s/he desires.

Among other components not shown, the computing system 200 generally includes a user computing device 210, a system computing device 212, and a data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of user computing devices, system computing devices and data stores may be employed in the computing system 200 within the scope of embodiments of the present invention. Each may comprise a single device/interface or multiple devices/interfaces cooperating in a distributed environment. For instance, the system computing device 212 may comprise multiple devices and/or modules arranged in a distributed environment that collectively provide the functionality of the system computing device 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the user computing device 210, as an Internet-based service, or as a module inside the system computing device 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of system and/or user computing devices. By way of example only, the system computing device 212 might be provided as a single device (as shown), a cluster of devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 210 may include any type of computing device, such as the computing device 100 described with reference to FIG. 1, for example. Generally, the user computing device 210 includes a browser and a display. The browser is configured to render a browser toolbar 218 including a search box 220, and a browser home page 222 in association with the display of the user computing device 210. The browser 218 is further configured to receive user inputted search queries via the browser toolbar search box 220 (which is configured to permit alpha-numeric and/or textual input) and to receive content for presentation, for instance, from the system computing device 212. It should be noted that the functionality described herein as being performed by the browser may be performed by any other application capable of rendering Web content. Any and all such variations, and any combination thereof, are contemplated to be within the scope of embodiments of the present invention.

The system computing device 212, as more fully described below, is configured to receive inputted search queries (generally input via the browser toolbar search box 220), determine one or more search results that match an input search query and present the results, as well as previews of the content of the results, in windows overlaying the browser home page 222. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the system computing device 212 includes a receiving component 224, a search results determining component 226, a search results window presenting component 228, a pre-fetching component 230, a web page preview presenting component 232, an annotating component 234 and a navigation component 236. The illustrated system computing device 212 also has access to a data store 214. The data store 214 is configured to store search query logs and content of and/or links to associated web sites. In embodiments, the data store 214 is configured to be searchable for one or more of the items stored in association therewith. It will be understood and appreciated by those of ordinary skill in the art that the information stored in association with the data store 214 may be configurable and may include any information relevant to received search queries and corresponding search results. The content and volume of such information are not intended to limit the scope of embodiments of the present invention in any way. Further, though illustrated as a single, independent component, the data store 214 may, in fact, be a plurality of storage devices, for instance a database cluster, portions of which may reside in association with the system computing device 212, the user computing device 210, another external computing device (not shown), and/or any combination thereof.

Figure 3:
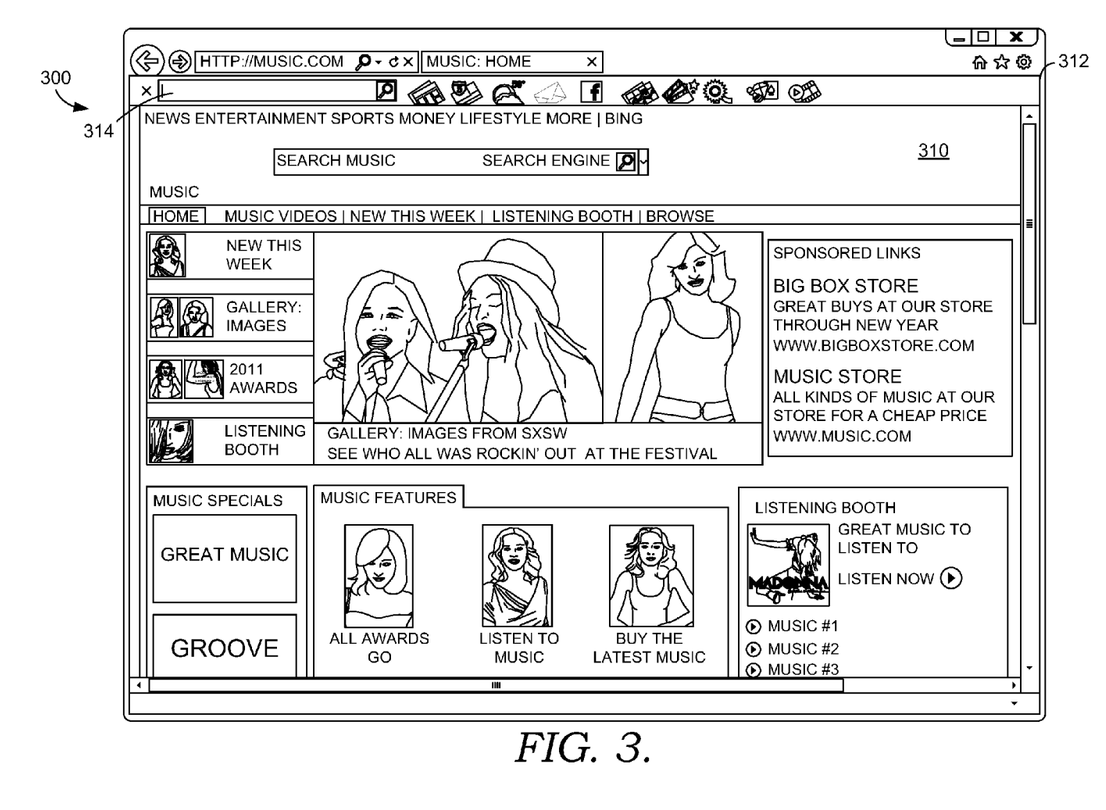
FIG. 3 is a schematic diagram showing an exemplary screen display of a web browser having a browser page and a toolbar, in accordance with an embodiment of the present invention.
Figure 4:
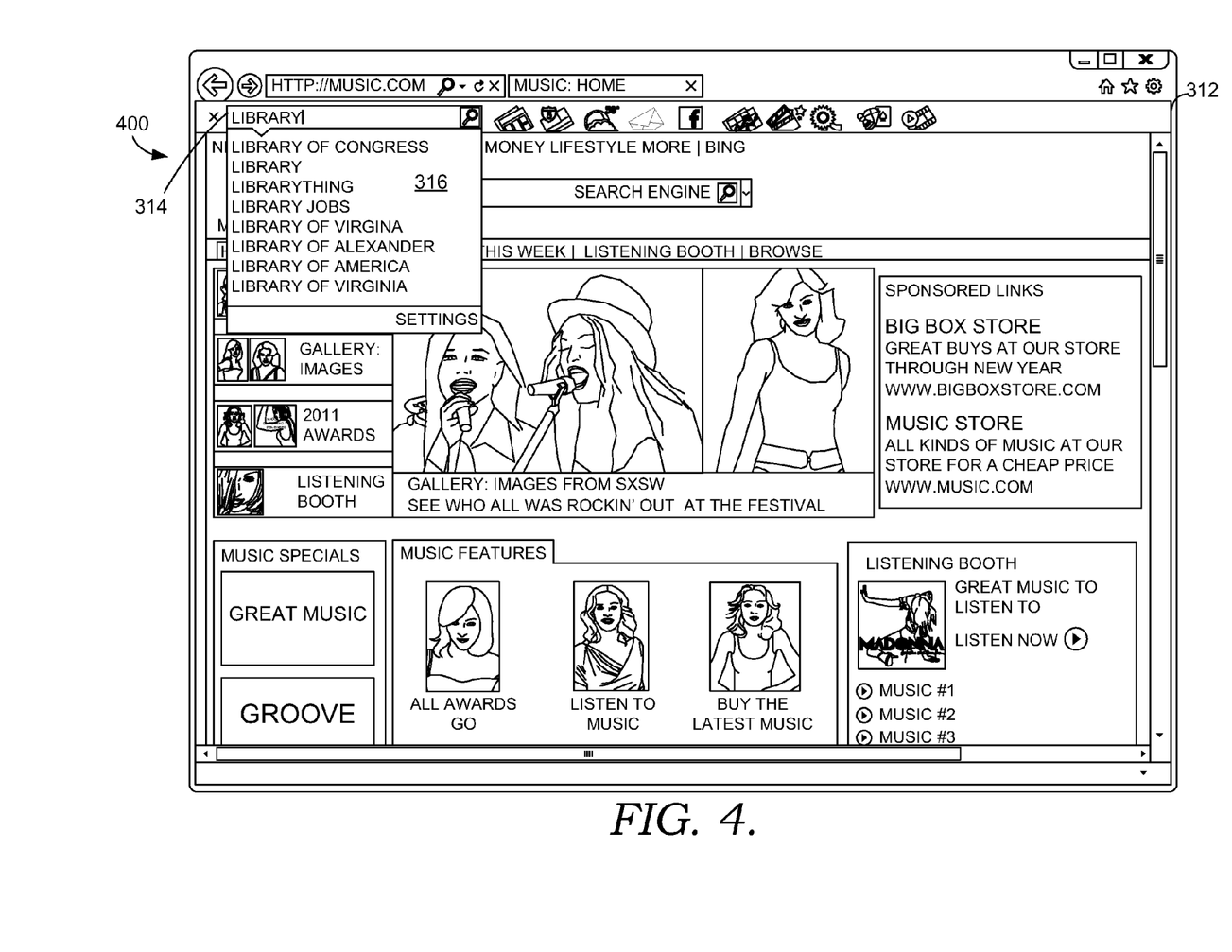
FIG. 4 is a schematic diagram showing the exemplary screen display of FIG. 3 when a user begins to input a search query into a search box associated with the toolbar with automatic query completion suggestion provided, in accordance with an embodiment of the present invention.

The receiving component 224 of the system computing device 212 is configured to receive search queries, for instance, search queries input via user computing device 210. By way of example, FIG. 3 is a schematic diagram illustrating an exemplary screen display 300 of a web browser having a browser home page 310 and a toolbar 312, in accordance with an embodiment of the present invention, the toolbar 312 including a search box 314 configured to receive input of search queries. Upon entry of at least a portion of search query into the search box 314, the query (or portion thereof) is received by the receiving component 224. In the illustrated embodiment, automatic query completion suggestions are provided upon entry of a partial query. This is shown with reference to FIG. 4 which illustrates a schematic diagram 400 of the exemplary screen display of FIG. 3 when a user begins to input a search query into the search box 314 associated with the toolbar 312. In the illustrated example, a user has begun to input the word "LIBRARY" and automatic query completion suggestions 316 are being provided. One such query completion suggestion is "LIBRARY OF CONGRESS."

Though the illustrated examples depict entry of a search query into a search box associated with a browser toolbar, it should be understood and appreciated by those of ordinary skill in the art that the methods and systems described herein are equally applicable utilizing an application (for instance, a WINDOWS application provided by Microsoft Corporation of Redmond, Wash.) or as an extension or plug-in associated with a search provider (for instance, GOOGLE CHROME developed by Google, Inc. of Mountain View, Calif., or FIREFOX developed by Mozilla Corporation of Mountain View, Calif.).

With reference back to FIG. 2, the receiving component 224 is further configured to receive an indication (e.g., a mouse-over or hover-over event) from a user that s/he desires to view a web page associated with a particular search result, as more fully described below.

The search results determining component 226 is configured to determine one or more search results that matches an input search query. In embodiments, search results are determined by accessing the data store 214. The search results window presenting component 228 is configured to present at least a portion of the search results determined to match the input search query in a search results window overlaying a first portion of the browser page. This is shown with reference to the screen display of FIG. 5 which illustrates the exemplary screen display of FIG. 3 upon user completion of an input search query. The screen display 500 shows a search results window 318 containing descriptors of a plurality of search results determined to match the input search query, in accordance with an embodiment of the present invention. In the illustrated embodiment, the user has selected the query completion suggestion "LIBRARY OF CONGRESS" presented as a query completion suggestion as shown in the screen display of FIG. 4.

Figure 5:
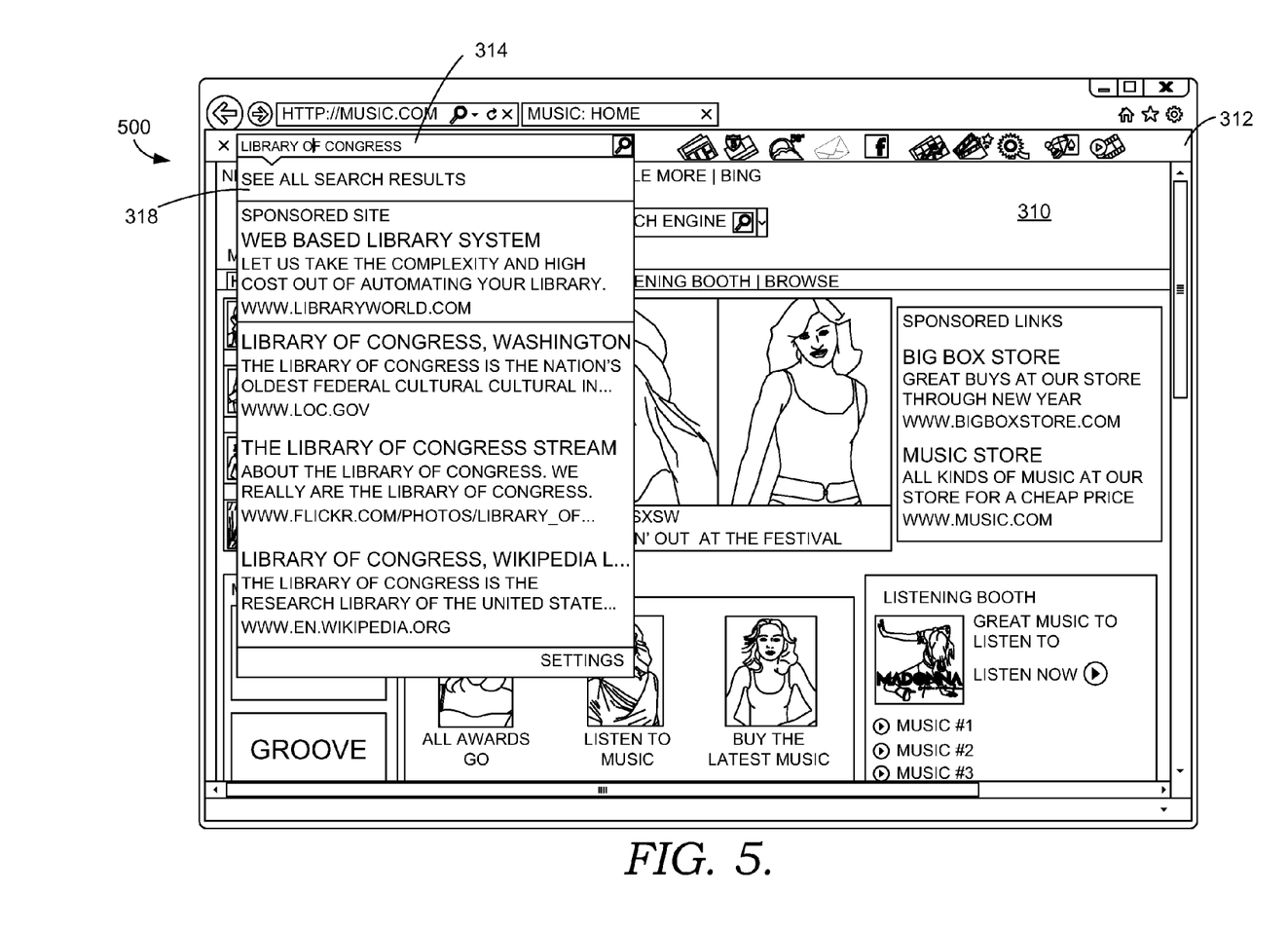
FIG. 5 is a schematic diagram showing the exemplary screen display of FIG. 3 upon user completion of an input search query, the screen display illustrating a search results window containing descriptors of a plurality of search results determined to match the input search query, in accordance with an embodiment of the present invention.

Generally, the search results window overlays a portion of the browser web page that is less than a total area of the browser page. In embodiments, the search results window visually appears as an extension of the search box associated with the web browser toolbar, as shown in FIG. 5. Note that the user is not navigated to a search engine results page (SERP) but rather is permitted to view descriptors of at least a portion of the matching search results in an overlay window.

Turning back to FIG. 2, the pre-fetching component 230 is configured to fetch or download at least a portion of a web page associated with each search results for which a search result descriptor is presented as soon as an input search query is received. Such web pages are cached until a user expresses an indication that s/he desires to preview a particular search result, as more fully described below.

The web page preview presenting component 232 is configured to present a preview of a web page associated with an indicated search result in an overlay window. The overlay window associated with the web page generally differs from the overlay window in which the search results descriptors are presented. In embodiments, the portion of the browser page overlaid with the search results window and the portion of the browser page overlaid with the web page preview collectively cover substantially the entire browser page.

Figure 6:
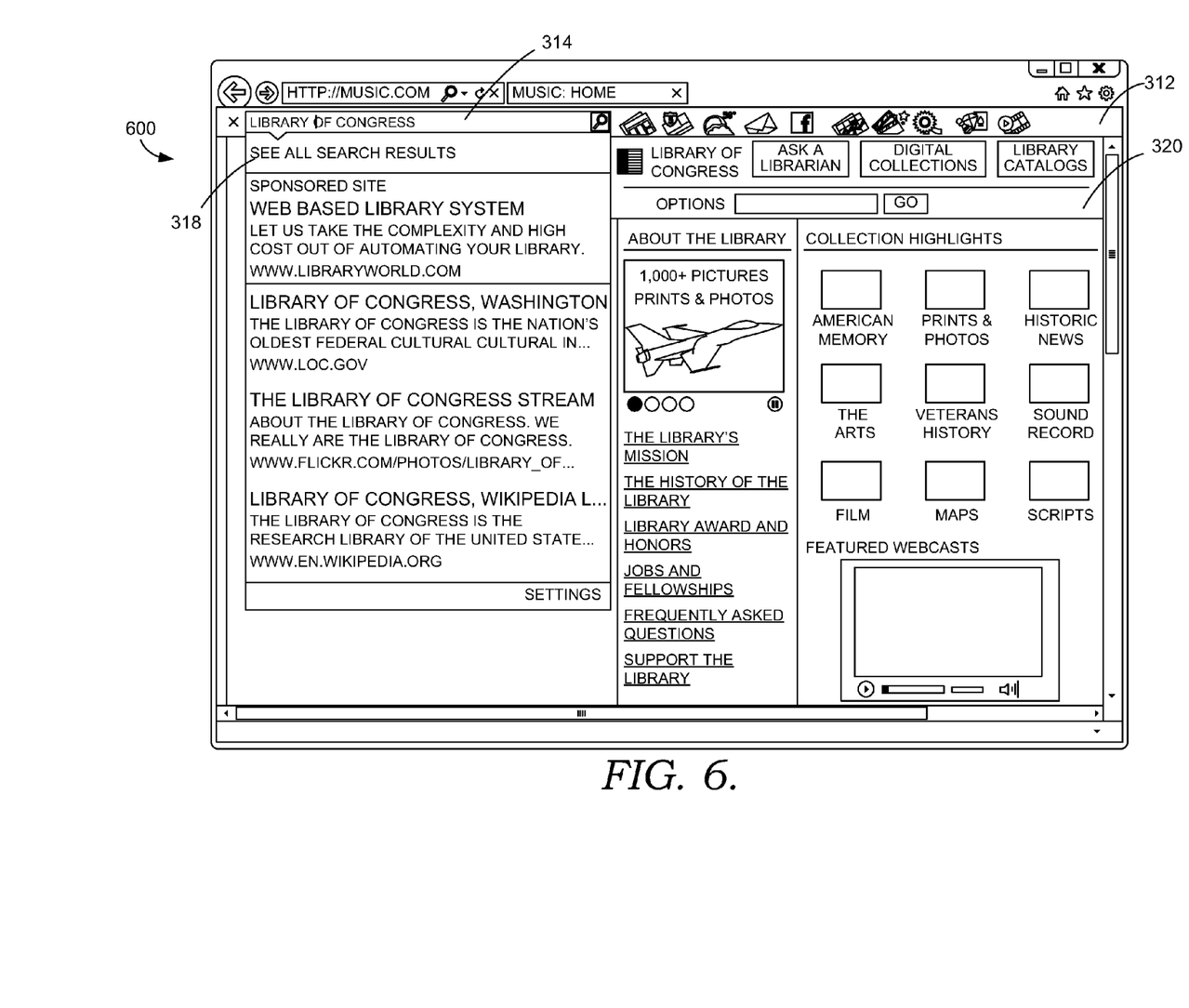
FIG. 6 is a schematic diagram showing the exemplary screen display of FIG. 5 when a user hovers over or otherwise indicates a desire to preview one of the plurality of search results presented in the search results window, in accordance with an embodiment of the present invention.

With reference to FIG. 6, a schematic diagram 600 is shown illustrating the exemplary screen display of FIG. 5 when a user hovers over or otherwise indicates a desire to preview one of the search results presented in the search results window, in accordance with an embodiment of the present invention. In the illustrated embodiment, the user has hovered over the "LIBRARY OF CONGRESS, WASHINGTON" search results preview shown in the search results window 318. The search results window 318 and the web page preview 320 collectively cover substantially the entire browser page.

In embodiments, the web site preview may be isolated from the toolbar as a security precaution. Thus, even though the toolbar and the preview may appear visually to the user as a single, contiguous application, if the web site associated with the previewed web page has a problem with the performance thereof, such problem may be isolated and not affect the toolbar itself.

Additionally, in embodiments, the web page preview may not appear exactly as the user would see it upon navigation to the browser. Rather, a version of the web page having diminished functionality with respect to the functionally associated with the web page upon navigation thereto may be presented. For instance, if the web page is configured to initiate play of a video upon navigation thereto, such initiation may be disabled when the web page is shown merely as a preview. By way of example only, JavaScript and ActiveX Controls, or any other items that make the web page interactive, may be disabled. However, for some web pages, disabling of the interactive functionality may make the preview less useful than desired. As such, a listing of domains or websites for which extra permissions are permitted may be maintained and consulted prior to presenting a web page preview.

Turning back to FIG. 2, the annotating component 234 is configured to annotate a presented web page preview with information designed to quickly aid the user in determining if the previewed web site contains the information s/he desires. For instance, such annotations may include, by way of example only, an indication of the popularity of the web site. The site may also be annotated by highlighting or otherwise visually drawing attention to the occurrences of the search term(s) in the web page itself. In embodiments, annotated information may be presented in a designated area of the web page preview, such as a bar running along the top of the page (not shown). In other embodiments, the toolbar itself may contextually change to include the desired information. Any and all such variations, and any combination thereof, are contemplated to be within the scope of embodiments of the present invention.

Figure 7:
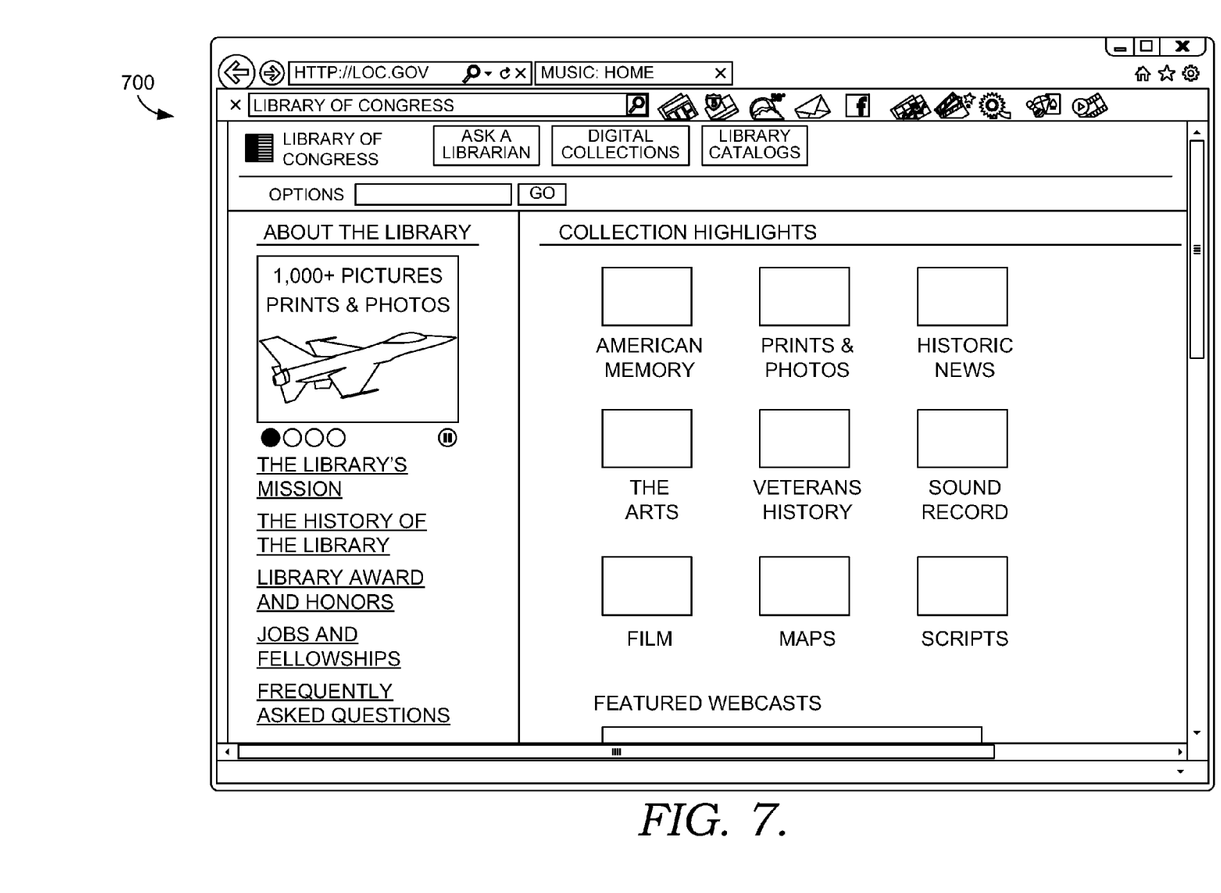
FIG. 7 is a schematic diagram showing an exemplary screen display presented upon user selection of one of the plurality of search results presented in the search results window of FIG. 5 or FIG. 6, in accordance with an embodiment of the present invention.

The navigation component 236 is configured to navigate a user to a previewed web page upon selection thereof (or upon selection of the search result descriptor from the search results window). Note that navigation to the web page does not occur prior to user selection yet the user is permitted to preview the content of the web page without selection thereof. Upon selection, the search results overlay window is no longer presented. With reference to FIG. 7, a schematic diagram is shown illustrating an exemplary screen display 700 presented upon user selection of one of the plurality of search results presented in the search results window of FIG. 5 or FIG. 6, in accordance with an embodiment of the present invention.

After navigating to a selected web page, the user may determine that the web page does not contain the desired information after all. Upon user selection back into the search box, the search results window reappears with the already pre-populated search result descriptors, this time overlaying the previously navigated-to web page. In this way, the user avoids having to navigate back to a SERP which takes additional time and effort. The user may then continue to preview additional web pages having descriptors presented in the search results window with navigation to another web page occurring only upon user selection thereof.

Figure 8:
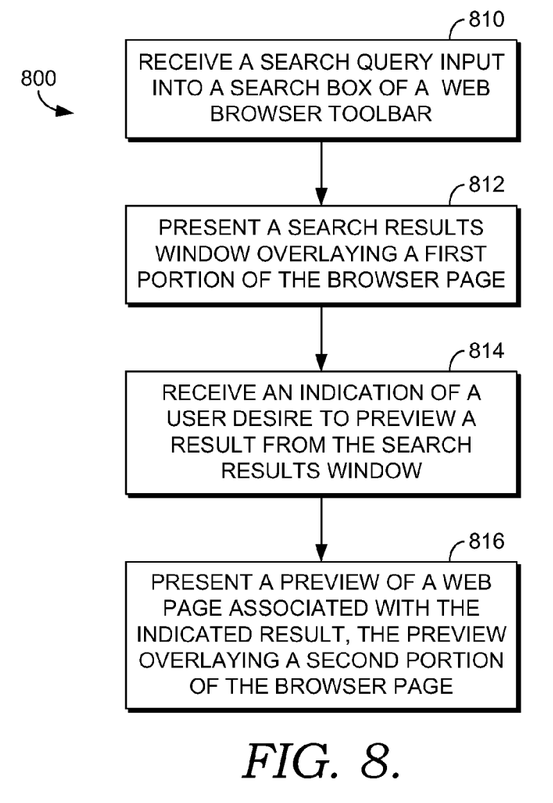
FIG. 8 is a flow diagram showing an exemplary method for previewing search results, in accordance with an embodiment of the present invention.

Turning now to FIG. 8, a flow diagram showing an exemplary method for previewing search results in accordance with an embodiment of the present invention is illustrated and designated generally as method 800. As indicated at block 810, a search query input into a search box associated with a web browser toolbar is received (e.g., input into search box 220 and received by receiving component 224 of FIG. 2). Search results determined to match the input search query (e.g., utilizing search results determining component 226 of FIG. 2) are presented (e.g., via search results window presenting component 228 of FIG. 2) in a window overlaying a first portion of a web page associated with the web browser, as indicated at block 812. Generally, the first portion of the web page is less than a total area of the browser page. The search results window contains descriptors associated with one or more search results determined to match the input search query. An indication (for instance, a mouse-over or hover-over event) of a user desire to preview one of the results presented in the search results window is received, as indicated at block 814. A preview of a web page associated with the indicated result is then presented (e.g., utilizing web page preview presenting component 232), as indicated at block 816, in a window overlaying a second portion of the browser page. Generally, the second portion of the browser page differs from the first portion. In embodiments, the first and second portions collectively overlay substantially all of the browser page.

Figure 9:
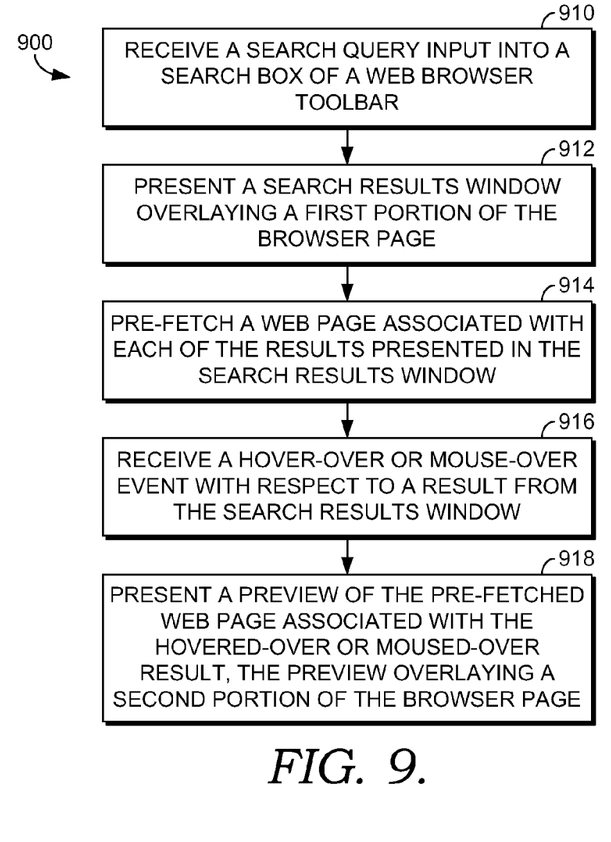
FIG. 9 is a flow diagram showing another exemplary method for previewing search results, in accordance with an embodiment of the present invention.

With reference to FIG. 9, a flow diagram showing another exemplary method for previewing search results in accordance with an embodiment of the present invention is illustrated and designated generally as method 900. As indicated at block 910, a search query input into a search box associated with a web browser toolbar is received (e.g., input into search box 220 and received by receiving component 224 of FIG. 2). Search results determined to match the input search query (e.g., utilizing search results determining component 226 of FIG. 2) are presented (e.g., via search results window presenting component 228 of FIG. 2) in a window overlaying a first portion of a web page associated with the web browser, as indicated at block 912. Generally, the first portion of the web page is less than a total area of the browser page. The search results window contains descriptors associated with one or more search results determined to match the input search query. At least a portion of a web page associated with each of the one or more search results presented in the search results window is pre-fetched (e.g., utilizing pre-fetching component 230 of FIG. 2). A mouse-over or hover-over event indicating a user desire to preview one of the results presented in the search results window is received, as indicated at block 916. A preview of the pre-fetched web page associated with the hovered-over or moused-over result is then presented (e.g., utilizing web page preview presenting component 232), as indicated at block 918, in a window overlaying a second portion of the browser page. Because pre-fetching of web pages associated with the presented search results likely began prior to receiving the mouse-over or hover-over event, the web page preview is quickly presented.

Figure 10:
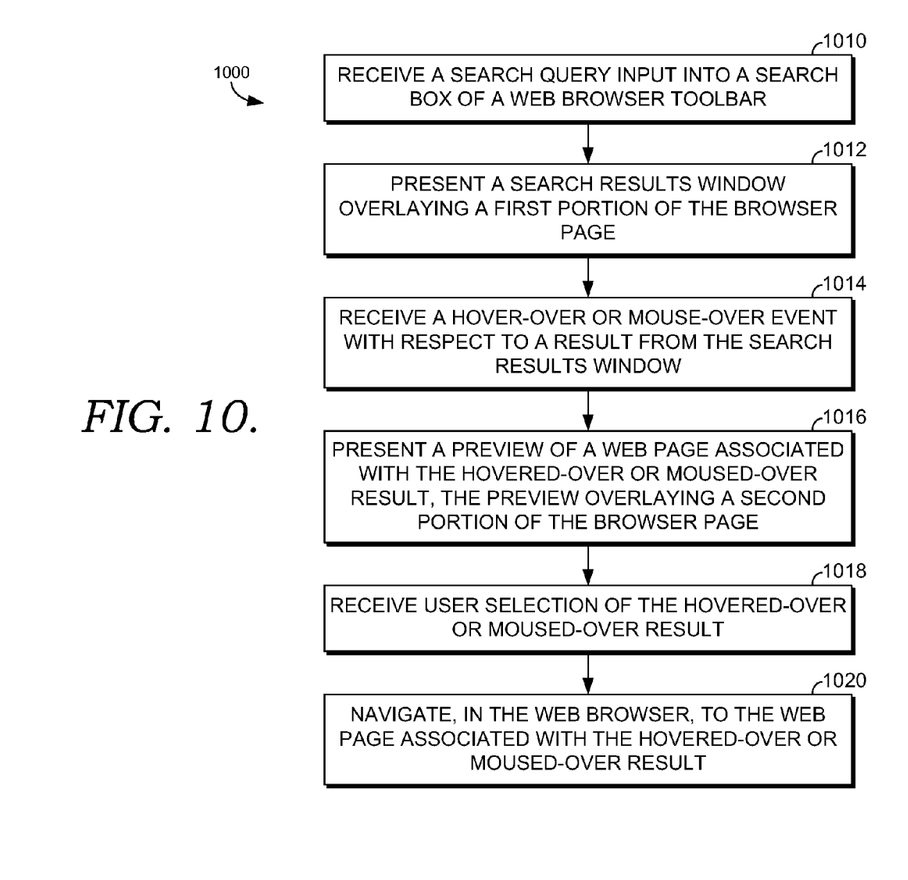
FIG. 10 is a flow diagram showing another exemplary method for previewing search results, in accordance with an embodiment of the present invention.

With reference to FIG. 10, a flow diagram is illustrated showing another exemplary method 1000 for previewing search results, in accordance with an embodiment of the present invention. As indicated at block 1010, a search query input into a search box associated with a web browser toolbar is received (e.g., input into search box 220 and received by receiving component 224 of FIG. 2). Search results determined to match the input search query (e.g., utilizing search results determining component 226 of FIG. 2) are presented (e.g., via search results window presenting component 228 of FIG. 2) in a window overlaying a first portion of a web page associated with the web browser, as indicated at block 1012. Generally, the first portion of the web page is less than a total area of the browser page and the search results window contains descriptors associated with one or more search results determined to match the input search query. A mouse-over or hover-over event indicating a user desire to preview one of the results presented in the search results window is received, as indicated at block 1014. A preview of a web page associated with the hovered-over or moused-over result is then presented (e.g., utilizing web page preview presenting component 232 of FIG. 2) in a window overlaying a second portion of the browser page. This is indicated at block 1016. The second portion of the browser page generally differs from the first portion. In embodiments, the first and second portions collectively overlay substantially the entire browser page. Next, a user selection of the hovered-over or moused-over result is received, as indicated at block 1018. The user is then navigated, in the web browser, to the web page associated with the moused-over or hovered over results (e.g., utilizing navigation component 236). This is indicated at block 1020.

As can be understood, embodiments of the present invention provide systems and methods for previewing search results in association with a web browser. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the methods 800 of FIG. 8, 900 of FIG. 9 and 1000 of FIG. 10 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more computer storage hardware devices storing computer-useable instructions that, when executed by one or more computing devices each having a processor and a memory, cause the one or more computing devices to perform a method for previewing search results in association with a web browser having a browser page and a toolbar, the method comprising:

receiving a search query input into a search box associated with the toolbar of the web browser;

presenting a search results window overlaying a first portion of the browser page of the web browser, the search results window blocking from view a portion of content of the browser page, and the search results window containing descriptors associated with one or more search results determined to match the input search query;

receiving an indication of a user desire to preview one of the one or more search results presented in the search results window; and presenting a preview of a web page associated with the one of the one or more search results, the preview overlaying a second portion of the browser page that differs from the first portion.

2. The one or more computer storage hardware devices of claim 1, wherein presenting the search results window overlaying the first portion of the browser page comprises presenting the search results window overlaying the first portion of the browser page such that the search results window visually appears as an extension of the search box associated with the web browser toolbar.

3. The one or more computer storage hardware devices of claim 1, herein the indication of the user desire to preview the one of the one or more search results presented in the search results window comprises a hover-over or mouse-over event with respect to the one of the one or more search results.

4. The one or more computer storage hardware devices of claim 1, wherein the preview of the web page associated with the one of the one or more search results comprises an annotated preview of the web page associated with the one of the one or more search results.

5. The one or more computer storage hardware devices of claim 1, wherein the preview of the web page associated with the one of the one or more search results has diminished functionality with respect to functionality associated with the web page upon navigation thereto.

6. The one or more computer storage hardware devices of claim 1, wherein the method further comprises pre-fetching at least a portion of a web page associated with each of the one or more search results presented in the search results window prior to receiving the indication of the user desire to preview the one of the one or more search results.

7. The one or more computer storage hardware devices of claim 1, wherein the method further comprises:

receiving an indication of a user desire to preview a second one of the one or more search results presented in the search results window; and presenting a preview of a web page associated with the second one of the one or more search results, the preview overlaying the second portion of the browser page.

8. The one or more computer storage hardware devices of claim 1, wherein the method further comprises:

receiving a user selection of the one of the one or more search results; and navigating, in the web browser, to the web page associated with the one of the one or more search results, wherein upon navigating to the web page associated with the one of the one or more search results, the search results window is no longer presented.

9. The one or more computer storage hardware devices of claim 8, wherein the method further comprises:

receiving a user selection within the search box associated with the web browser; and re-presenting the search results window containing descriptors associated with the one or more search results determined to match the input search query, the search results window being re-presented overlaying a portion of the web page associated with the one of the one or more search results.

10. A system for previewing search results in association with a web browser having a browser page and a toolbar, the system comprising:

a computing device having one or more processors and one or more computer-readable storage media; and a data store coupled with the computing device, wherein the computing device:

receives a search query input into a search box associated with the web browser toolbar;

presents a search results window overlaying a first portion of the browser page, the search results window blocking from view a portion of content of the browser page, and the search results window containing descriptors associated with one or more search results determined to match the input search query;

pre-fetches at least a portion of a web page associated with each of the one or more search results presented in the search results window;

receives a first hover-over or mouse-over event with respect to one of the one or more search results indicating a user desire to preview the one of the one or more search results; and presents a preview of a web page associated with the one of the one or more search results, the preview overlaying a second portion of the browser page that differs from the first portion.

11. The system of claim 10, wherein the computing device further:

receives a second hover-over or mouse-over event with respect a second one of the one or more search results presented in the search results window indicating a user desire to preview a second one of the one or more search results; and presents a preview of a web page associated with the second one of the one or more search results, the preview overlaying the second portion of the browser page.

12. The system of claim 10, wherein the computing device further:

receives a user selection of the one of the one or more search results; and navigates, in the web browser, to the web page associated with the one of the one or more search results, wherein upon navigating to the web page associated with the one of the one or more search results, the search results window is no longer presented.

13. The system of claim 10, wherein the computing device further:

receives a user selection within the search box associated with the web browser; and re-presents the search results window containing descriptors associated with the one or more search results determined to match the input search query, the search results window being re-presented overlaying a portion of the web page associated with the one of the one or more search results.

14. The system of claim 10, wherein the computing device presents the search results window overlaying the first portion of the browser page such that the search results window visually appears as an extension of the search box associated with the web browser toolbar.

15. The system of claim 10, wherein the preview of the web page associated with the one of the one or more search results comprises an annotated preview of the web page associated with the one of the one or more search results.

16. The system of claim 10, wherein the preview of the web page associated with the one of the one or more search results has diminished functionality with respect to functionality associated with the web page upon navigation thereto.

17. A method for previewing search results in association with a web browser having a browser page and a toolbar, the method comprising:

receiving a search query input into a search box associated with the web browser toolbar;

presenting a search results window overlaying a first portion of the browser page such that the search results window blocks from view a portion of content on the browser page, and the search results window containing descriptors associated with one or more search results determined to match the input search query;

receiving a first hover-over or mouse-over event with respect to one of the one or more search results indicating a user desire to preview the one of the one or more search results;

presenting a preview of a web page associated with the one of the one or more search results, the preview overlaying a second portion of the browser page that differs from the first portion;

receiving a user selection of the one of the one or more search results; and navigating, in the web browser, to the web page associated with the one of the one or more search results, wherein upon navigating to the web page associated with the one of the one or more search results, the search results window is no longer presented.

18. The method of claim 17, further comprising:

receiving a user selection within the search box associated with the web browser; and re-presenting the search results window containing descriptors associated with the one or more search results determined to match the input search query, the search results window being re-presented overlaying a portion of the web page associated with the one of the one or more search results.

19. The method of claim 17, further comprising pre-fetching at least a portion of a web page associated with each of the one or more search results presented in the search results window prior to receiving the first hover-over or mouse-over event with respect to one of the one or more search results.

20. The method of claim 17, wherein the preview of the web page associated with the one of the one or more search results has diminished functionality with respect to functionality associated with the web page upon navigation thereto.

* * * * *